United States Patent
Tang et al.

(10) Patent No.: US 9,466,319 B1
(45) Date of Patent: Oct. 11, 2016

(54) PERPENDICULAR MAGNETIC RECORDING (PMR) WRITE SHIELD DESIGN WITH MINIMIZED WIDE ADJACENT TRACK ERASURE (WATE)

(71) Applicant: Headway Technologies, Inc., Milpitas, CA (US)

(72) Inventors: Yuhui Tang, Milpitas, CA (US); Yaguang Wei, Pleasanton, CA (US); Yue Liu, Fremont, CA (US); Moris Dovek, San Jose, CA (US); Xiaomin Liu, Fremont, CA (US); Feiyue Li, Fremont, CA (US); Po-Kang Wang, Los Altos, CA (US); Luc Thomas, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 14/847,418

(22) Filed: Sep. 8, 2015

(51) Int. Cl.
| | |
|---|---|
| *G11B 5/11* | (2006.01) |
| *G11B 5/31* | (2006.01) |
| *G11B 5/127* | (2006.01) |
| *G11B 5/60* | (2006.01) |
| *C23C 28/02* | (2006.01) |

(52) U.S. Cl.
CPC .......... *G11B 5/1278* (2013.01); *C23C 28/021* (2013.01); *G11B 5/11* (2013.01); *G11B 5/112* (2013.01); *G11B 5/1272* (2013.01); *G11B 5/315* (2013.01); *G11B 5/3143* (2013.01); *G11B 5/3146* (2013.01); *G11B 5/6082* (2013.01)

(58) Field of Classification Search
CPC ..... G11B 5/11; G11B 5/3143; G11B 5/3146; G11B 5/315
USPC .................................................. 360/125.3
See application file for complete search history.

(56) References Cited

U.S. PATENT DOCUMENTS

| | | |
|---|---|---|
| 6,353,511 B1 | 3/2002 | Shi et al. |
| 7,113,367 B2 | 9/2006 | Yazawa et al. |
| 8,089,723 B2 | 1/2012 | Schabes |
| 8,284,516 B1 * | 10/2012 | Tang .................... G11B 5/1278 360/125.03 |
| 8,462,461 B2 | 6/2013 | Braganca et al. |

(Continued)

OTHER PUBLICATIONS

Co-pending U.S. Appl. No. 14/947,577, filed Nov. 20, 2045, "Areal Density Improvement of Perpendicular Magnetic Recording (PMR) Write Head by Tuning Magnetic Flux Loops,", by Yaguang Wei et al., 45 Pgs.

(Continued)

*Primary Examiner* — Jefferson Evans
(74) *Attorney, Agent, or Firm* — Saile Ackerman LLC; Stephen B. Ackerman

(57) ABSTRACT

A Perpendicular Magnetic Recording (PMR) writer is disclosed with an all wrap around (AWA) shield design in which one or more of the leading shield, second trailing shield, and side shields consist of a high damping (HD) magnetic material having a damping constant ≥0.04. A first trailing shield between the write gap and second trailing shield is a 19-24 kG hot seed layer. The HD magnetic layer may be FeNiRe with a Re content of 3 to 15 atomic %. Preferably, the HD magnetic layer has a coercivity <50 Oe and is a 10-19 kG material. One or both of the main pole leading and trailing sides may be tapered. Wide adjacent track erasure is minimized while area density capability is maintained. In other embodiments, the HD magnetic material may be one of FeNiM, FeNM, FeCoM, or FeCoNiM where M is a 3d, 4d, or 5d transition metal.

24 Claims, 6 Drawing Sheets

(56) References Cited

U.S. PATENT DOCUMENTS

| | | | |
|---|---|---|---|
| 9,123,359 B1* | 9/2015 | Han | G11B 5/1278 |
| 9,214,165 B1* | 12/2015 | Liu | G11B 5/11 |
| 2008/0113090 A1* | 5/2008 | Lam | G11B 5/1278 427/123 |
| 2011/0097601 A1* | 4/2011 | Bai | G11B 5/1278 428/815 |
| 2011/0151279 A1* | 6/2011 | Allen | G11B 5/112 428/815 |
| 2012/0050921 A1 | 3/2012 | Marshall | |
| 2012/0327531 A1* | 12/2012 | Takahashi | G11B 5/3116 360/75 |
| 2014/0169146 A1* | 6/2014 | Yin | G11B 5/1278 369/13.33 |
| 2015/0043107 A1* | 2/2015 | McNeill | G11B 5/11 360/236.8 |

OTHER PUBLICATIONS

Co-pending U.S. Appl. No. 14/848,391, filed Sep. 9, 2015, "Perpendicular Magnetic Recording (PMR) Writer With Hybrid Shield Layers," by Yuhui Tang et al., 61 pgs.

"Effect of 3d, 4d, and 5d transition metal doping on damping in permalloy thin films," by J. O. Rantschler et al., Journal of Applied Physics 101, 033911, Feb. 14, 2007, pp. 1-5.

"Micromagnetic Analysis of Adjacent Track Erasure of Wrapped-Around Shielded PMR Writers," by Suping Song et al., IEEE Transactions on Magnetics, vol. 45, No. 10, Oct. 2009, pp. 3730-3732.

"Characterization of Adjacent Track Erasure in Perpendicular Recording by a Stationary Footprint Technique," by Yuhui Tang et al., IEEE Transactions on Magnetics, vol. 49, No. 2, Feb. 2013, pp. 744-750.

"Magnetic Damping in Ferromagnetic Thin Films," by Mikihiko Oogane et al., Japanese Journal of Applied Physics, vol. 45, No. 5A, May 9, 2006, pp. 3889-3891.

Co-pending U.S. Appl. No. 14/933,758, filed Nov. 5, 2015, by Sanghyun Lim et al., Perpendicular Magnetic Recording (PMR) Writer with Improved Trailing Shield Design, 16 pgs.

* cited by examiner

PERPENDICULAR MAGNETIC RECORDING (PMR) WRITE SHIELD DESIGN WITH MINIMIZED WIDE ADJACENT TRACK ERASURE (WATE)

RELATED PATENT APPLICATIONS

This application is related to the following: U.S. Pat. No. 8,749,919; Ser. No. 14/947,577, filing date Nov. 20, 2015; and Ser. No. 14/848,391, filing date Sep. 9, 2015; assigned to a common assignee and herein incorporated by reference in their entirety.

TECHNICAL FIELD

The present disclosure relates to a shield structure in a PMR write head wherein one or more of a trailing shield, side shields, and leading shield are made of a high damping magnetic material such as FeNiRe, and have a side adjoining a gap layer in order to reduce WATE while maintaining areal density capability (ADC) for both conventional magnetic recording and shingle magnetic recording applications.

BACKGROUND

Perpendicular magnetic recording has been developed in part to achieve higher recording density than is realized with longitudinal recording devices. A PMR write head typically has a main pole with a small surface area at an air bearing surface (ABS), and coils that conduct a current and generate a magnetic flux in the main pole such that the magnetic flux exits through a write pole tip and enters a magnetic medium (disk) adjacent to the ABS. Magnetic flux is used to write a selected number of bits in the magnetic medium and typically returns to the main pole through two pathways including a trailing loop and a leading loop in a so-called double write shield (DWS) structure. The trailing loop comprises a trailing shield structure with a side at the ABS and a portion that extends over the write coils and connects to a top surface of the main pole layer above a back gap magnetic connection. The leading loop includes a leading shield with a side at the ABS and that is connected to a return path proximate to the ABS. The return path extends to the back gap connection and enables magnetic flux in the leading loop pathway to return from the leading shield at the ABS and through the back gap connection to the main pole layer. A PMR head which combines the features of a single pole writer and a double layered medium (magnetic disk) has a great advantage over LMR in providing higher write field, better read back signal, and potentially much higher ADC.

For both conventional (CMR) and shingle magnetic recording (SMR), continuous improvement in storage area density is required for a PMR writer. A write head that can deliver or pack higher bits per inch (BPI) and higher tracks per inch (TPI) is essential to the area density improvement. A fully wrapped around shield design also known as an all wrap around (AWA) shield structure for a PMR write head is desired where the trailing shield is responsible for improving down track field gradient while side shields and a leading shield improve the cross track field gradient and TPI as well as adjacent track erasure (ATE) performance. To avoid wide adjacent track erasure (WATE), all shields are typically made of a <19 kG material that is CoFe, NiFe, or CoFeNi. A double write shield (DWS) design may be employed wherein the main pole is comprised of high moment (>19 kG to 24 kG) material. If writeability can be sustained, a thinner write gap at the main pole trailing (top) surface and a narrower side gap adjoining the main pole sides in the cross-track direction are preferred for better track field gradient ($Hy\_grad$, BPI) and cross-track field gradient ($Hy\_grad\_x$, TPI), respectively.

In hard disk drives (HDD), WATE is one of the most critical issues for PMR writer designs. Both micromagnetic modeling that is described by S. Song et al. in "Micromagnetic analysis of adjacent track erasure of wrapped-around shielded PMR writers", IEEE Trans. Magn., vol. 45, no. 10, pp. 3730-3732 (2009), and experimental data described by Y. Tang et al. in "Characterization of Adjacent Track Erasure in Perpendicular Recording by a Stationary Footprint Technique", IEEE Trans. Magn., vol. 49, no. 2, pp. 744-750 (2013) indicate that one root cause of WATE is the stray field from side shields and leading shield during the dynamic writing cycles. It is observed that adjacent track erasure has strong writing frequency dependence and can be expected to be much more severe as increased ultra-high data rate HDDs are produced in the future.

Thus, the key to an optimized PMR writer structure is the capability to control distribution of magnetic flux from the main pole to each shield. Ideally, better control of magnetic flux in the near field or proximate to the main pole is desirable to minimize WATE while maintaining ADC. Improved shield design is required for tuning magnetic flux distribution to enable PMR writers with higher TPI capability to at least 400K/in for CMR and at least 500K/in for SMR.

SUMMARY

One objective of the present disclosure is to provide a magnetic shield structure for a PMR writer that enables a means of minimizing wide adjacent track erasure while maintaining area density capability (ADC) in advanced PMR writers.

Another objective of the present disclosure is to provide a method of fabricating a shield design according the first objective that has a production cost similar to that of current shield structures made of CoFe, NiFe, or CoFeNi.

According to a first embodiment, these objectives are achieved with a PMR writer shield configuration having an AWA design wherein one or more of a leading shield, side shields, and second trailing shield are made a high damping magnetic material with a Gilbert damping constant (a) of at least 0.04, and preferably $\geq 0.05$. The high damping magnetic material may be FeNiRe with a Re content between 3 and 15 atomic %. However, other alloys including but not limited to FeCoRe, FeCoNiRe, FeNiM, FeCoM, FeNM, and FeCoNiM where M is one of Os, Ir, Rh, Ti, Ta, V, Cr, W, Mn, Mo, Cu, Zr, Nb, Hf, Ru, Pd, Pt, Ag, and Au may also be employed as the high damping magnetic layer. The aforementioned alloys are preferably Fe rich with a Fe content $\geq 50$ atomic % to provide a high magnetization saturation (Ms) value.

The write pole portion of the main pole has a leading side with a leading edge at the ABS that is separated from a leading shield by a leading gap, a trailing side with a trailing edge at the ABS that is separated from a first trailing shield by a write gap, and two sides connecting the trailing and leading sides wherein the two sides are formed equidistant from a center plane that is orthogonal to the trailing and leading sides. The trailing side may be tapered with respect to a first plane that includes a trailing edge at the ABS where the first plane is also formed orthogonal to the center plane and to the ABS. Similarly, the leading side may be tapered with respect to a second plane that includes a leading edge at the ABS and where the second plane is also formed orthogonal to the center plane and to the ABS. Each of the two write pole sides is separated from a side shield by a side gap. Each of the write gap, side gaps, and leading gap are comprised of a dielectric material.

In one embodiment, both of the side shields and leading shield consist of a high damping magnetic layer made of a 10-19 kG material. The side shields contact the leading shield along the second plane. The trailing shield may be made of a conventional 10-19 kG material such as CoFe, NiFe, or CoFeNi and contacts the side shields at the first plane. A first trailing shield that is a 19-24 kG hot seed (high moment) layer is formed between the write gap and the second trailing shield. In another embodiment, only the side shields consist of the high damping magnetic layer while the leading shield and second trailing shield comprise CoFe, NiFe, CoFeNi, or the like. In other embodiments, only the leading shield consists of the high damping magnetic layer while the side shields and second trailing shield are comprised of CoFe, NiFe, CoFeNi, or the like. In yet another embodiment, the second trailing shield, side shields, and leading shield all consist of a high damping magnetic material as described previously.

From a top-down perspective, each of the side shields has a main pole facing side that extends to a first height from the ABS, and is preferably parallel to at least a section of the nearest write pole side wherein each of the write pole sides is formed at an angle $\alpha 1$ from 0 to 40 degrees with respect to the center plane. In some embodiments, each side shield has a second side that extends from an end of the main pole facing side to a side of the side shield at a second height that is a greater distance from the ABS than the first height. In other embodiments, each side shield may have a second side connected to an end of the main pole facing side and formed parallel to the ABS at the first height, and a third side connected to a far end of the second side at the first height and extending to a side of the side shield at a third height greater than the first height.

A method for forming the AWA shield structure wherein each of the leading shield, side shields, and second trailing shield consist of a high damping magnetic layer described previously is provided. A high damping (HD) magnetic layer is deposited on a substrate. An opening with sidewalls is formed in an upper portion of the HD magnetic layer that exposes a section of a bottom portion thereof wherein the bottom portion becomes the leading shield, and the upper portion becomes two side shields in the final shield structure. Thereafter, a gap layer is conformally deposited on the sidewalls and bottom surface of the opening to form side gaps and a leading gap, respectively. Next, the main pole layer is plated to fill the opening, and a chemical mechanical polish process is performed to form a planar top surface of the main pole, side gaps, and the side shield portions of the HD magnetic layer. The write gap and a 19-24 kG magnetic (first trailing shield) layer are sequentially deposited on the planar top surface, and are then etched to remove portions thereof except above the main pole top surface, side gaps, and a portion of the side shields adjacent to the side gaps. Then, a 10-19 kG high damping magnetic layer which is a second trailing shield is plated on exposed portions of the side shields and on the first trailing shield. Optionally, a conventional FeCo, FeCoNi, or FeNi layer is deposited as the second trailing shield. The overlying layers in the PMR write head are then formed on the HD trailing shield by conventional processes.

BRIEF DESCRIPTION OF THE DRAWINGS

FIG. 8a and FIGS. 9-13a are ABS views showing a sequence of steps where an AWA shield structure is formed around a main pole in a PMR writer according to an embodiment of the present disclosure.

DETAILED DESCRIPTION

Figure 1:
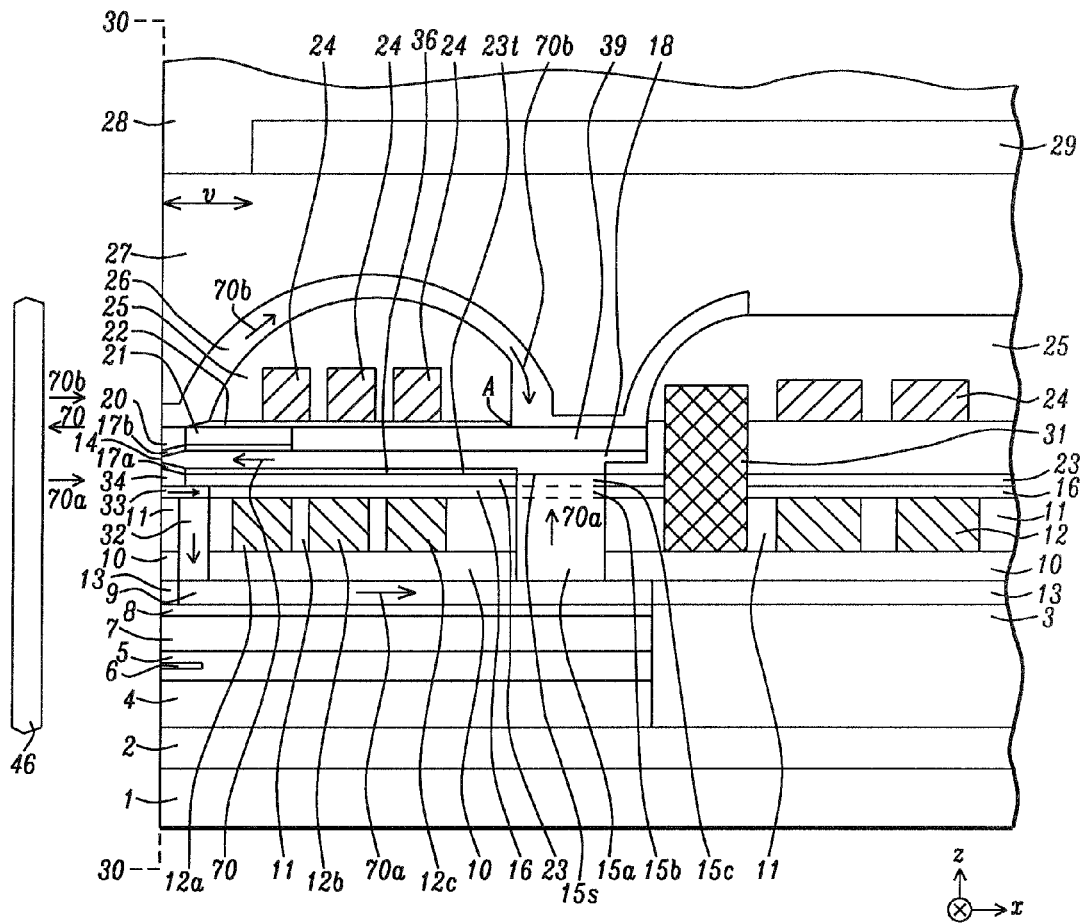
FIG. 1 is a down-track cross-sectional view showing a PMR writer having a double write shield (DWS) design with two flux return pathways to the main pole.

The present disclosure relates to a high damping magnetic layer made of a 10-19 kG material and with a Gilbert damping constant (a) of at least 0.04, and preferably ≥0.05 in one or more of a leading shield, side shields, and second trailing shield in order to minimize WATE while maintaining an acceptable ADC for advanced HDD devices. The main pole may have one or both of a tapered leading side and tapered trailing side. In the drawings, the y-axis is a cross-track direction, the z-axis is a down-track direction, and the x-axis is in a direction orthogonal to the ABS and towards a back end of the PMR writer. It should be understood that the composite shield design described herein is compatible with a variety of PMR writer structures and is not limited to a specific write head structure or to a particular combined read head/write head configuration. For instance, the write head may have a DWS or non-DWS configuration as defined herein.

Referring to FIG. 1, a PMR writer with a combined read head/write head structure currently fabricated by the inventors according to a process of record (POR) is depicted in a cross-sectional view from a plane that is orthogonal to an air bearing surface (ABS) 30-30. The combined read head/write head is formed on a substrate 1 that may be comprised of AlTiC (alumina+TiC). Those skilled in the art will recognize that layers 2-8 represent the read head portion of the recording device while layers 9-35 represent the write head portion. The substrate is typically part of a slider (not shown) formed in an array of sliders on a wafer. After the read head/write head is completed, the wafer is sliced to form rows of sliders. Each row is typically lapped to afford an ABS before dicing to fabricate individual sliders that are used in magnetic recording devices.

The present disclosure anticipates that one or more dynamic fly height (DFH) heater elements (not shown) may be formed in one or more insulation layers in the PMR writer structure to control the extent of thermal expansion (protrusion) along the ABS toward a magnetic medium 46 during a read or write process. Read gap (RG) and write gap (WG) protrusion may be tuned by the placement of the one or more DFH heater elements, and by the choice of metal or alloy selected for the DFH heater elements since each DFH heater resistor material has a particular thermal and mechanical response to a given electrical input through a lead.

A first insulation layer 2 that may be comprised of alumina or another dielectric material is disposed on substrate 1. There is a second insulation layer 3 formed on the first insulation layer and behind the read head layers 4-8. Above layer 2 is the S1 shield 4 that is comprised of NiFe or CoFeNi or the like, and extends from the ABS toward a back end of the read head. A read gap 5 is formed between the S1 shield 4 and top shield layer 7. A magnetoresistive element or sensor 6 is formed in the read gap 5 along the ABS 30-30 and typically includes a plurality of layers (not shown) in which two ferromagnetic layers are separated by a non-magnetic layer. The magnetic moment direction in one of the ferromagnetic layers is fixed and provides a reference direction, and the moment direction in the other ferromagnetic layer may be rotated by the magnetic field from the media. Resistance across the read gap changes as the moment in the second ferromagnetic layer rotates. A "0" or "1" magnetic state can be defined depending on whether the two ferromagnetic layers are magnetically aligned in the same direction or in an anti-parallel fashion. The non-magnetic layer in the sensor 6 may be comprised of Cu in a giant magnetoresistive (GMR) sensor, or may be an insulator such as alumina or MgO in a tunneling magnetoresistive (TMR) sensor.

Top shield layer 7 and insulation layer 8 are formed sequentially on read gap 5. Top shield layer 7 has a stack represented by S2A/insulation layer/S2B, and the S2A, S2B layers may be made of the same magnetic material as in the S1 shield 4. Insulation layer 8 may be the same dielectric material as in insulation layer 2.

The write head portion of the PMR writer in FIG. 1 has a double write shield (DWS) configuration featuring leading loop and trailing loop flux return pathways. Main pole 18 transmits magnetic flux 70 through a write pole tip 14 and into a magnetic medium 46. In the leading loop, return path (RTP) 9 is formed on insulation layer 8 and is recessed from the ABS, but is able to transmit flux 70a from the magnetic medium, leading shield 34, leading shield connector (LSC) 33, and S2C shield 32 to the back gap connection (BGC) comprised of magnetic sections 15a-15c. BGC section 15c has a top surface 15s which contacts a bottom surface of a back portion of main pole 18 to complete the leading loop.

Magnetic flux from the magnetic medium 46 also returns to the main pole via trailing loop pathway 70b by entering the trailing shield 20 at the ABS and then passing through PP3 trailing shield 26 before reaching the main pole. The dual flux return pathway in the POR design is employed to reduce adjacent track erasure (ATE). Typically, about 50% of flux returns through pathway 70a and about 50% through pathway 70b.

The present disclosure also anticipates the PMR write head may have a non-DWS configuration where only the trailing loop is present. In this embodiment (not shown), one or more of LSC 33, S2C shield 32, RTP 9, and BGC sections 15a-15c are omitted and preferably replaced by an insulation layer to force most of the magnetic flux from the magnetic medium to return to the main pole through pathway 70b. The non-DWS configuration may be advantageously used to improve ADC.

Returning to FIG. 1, the BGC may be depicted with three sections formed in a laminated manner and represented by stack 15a/15b/15c wherein a bottommost (lower) section 15a contacts a top surface of RTP 9, and an uppermost section 15c with top surface 15s contacts a back portion of the bottom surface of main pole 18. In the exemplary embodiment, there is a first insulation layer 10 formed on the RTP and having an ABS facing side adjoining a bottom portion of the S2C 32 back side, and a back side abutting an ABS facing side of BGC lower section 15a. A second insulation layer 11 is formed on the first insulation layer and extends orthogonal to the ABS from an upper portion of the S2C back side to an ABS facing side of BGC section 15b.

In some embodiments, a bucking coil layer 12 with three turns 12a-12c is formed within the second insulation layer 11 and between the S2C back side and BCG section 15b. However, the present disclosure also anticipates that a bucking coil layer with one turn, two turns, or four turns in a 1+1T, 2+2T, or 4+4T configuration may be employed as appreciated by those skilled in the art. Bucking coils are wound in series with an opposite polarity to that in the driving coils 24 to minimize direct coupling between the trailing shield 20 and driving coils. A top surface of the bucking coil layer is preferably coplanar with a top surface of the second insulation layer, a top surface of BGC section 15a, and a top surface of S2C shield 32.

The second insulation layer 11 may also be formed between the ABS 30-30 and an upper portion of S2C shield 32. First insulation layer 10 may be formed between the ABS and a bottom portion of the S2C shield. RTP 9 is within insulation layer 13 and is recessed a certain distance from the ABS. Insulation layers 10, 11, 13 are comprised of a dielectric material and the bucking coil layer 12 is typically a conductive material such as Cu. In the process of record (POR) practiced by the inventors, leading shield 34, LSC 33, S2C, back gap connection 15a-c, and RTP 9 are made of FeCoN, FeNi, FeCo, or FeCoNi having a magnetization saturation value of 10-16 kG.

A third insulation layer 16 contacts the top surface of the bucking coil turns 12a-12c and the top surface of second insulation layer 11 between a back side of LSC 33 and an ABS facing side of BGC section 15c. There is a fourth insulation layer 23 formed on the third insulation layer and on a back end portion of the LSC. The fourth insulation layer extends from a back side of the leading shield 34 to an ABS facing side of uppermost BGC section 15d. According to one embodiment, first through second insulation layers have a combined thickness in a down-track direction substantially the same as BGC section 15a, while third and fourth insulation layers have a thickness essentially the same as BGC sections 15b, 15c, respectively. Thus, top surface 23t of the fourth insulation layer is essentially coplanar with a top surface 15s of the BGC. In some embodiments, a bottom yoke 36 is provided between a lead gap 17a and a back portion of the main pole that adjoins top surface 15s. In the exemplary embodiment, the bottom yoke contacts top surface 23t and has a thickness essentially equal to that of the lead gap.

Above bottom yoke 36 is the main pole 18 that may be comprised of FeCo, FeNi, FeCoNi or another magnetic material. Main pole 18 has a front portion called a write pole with a write pole tip 14 at the ABS 30-30. The main pole extends toward the back end of the device where a back portion is magnetically connected with back gap connection 15. The leading shield is separated from the main pole by the lead gap 17a. Flux from the main pole enters the magnetic medium 46 and returns in part as flux 70a though the leading loop comprised of LS 34, LSC 33, S2C 32, RTP 9, and BGC 15.

Figure 2:
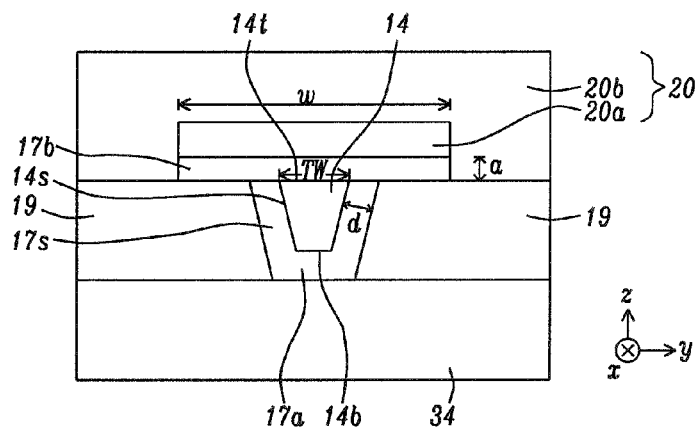
FIG. 2 is an ABS view of the PMR writer in FIG. 1 that shows an all wrap around (AWA) shield structure including a trailing shield, sides shields, and a leading shield.

A trailing shield 20 has a bottom surface formed on a write gap 17b at the ABS and extends from the ABS 30-30 to an ABS facing (front) side of non-magnetic layer 21. The trailing shield may be a composite as shown in FIG. 2 with a lower 19-24 kG layer (first trailing shield 20a) and an upper (second trailing shield 20b) made of FeCoNi, FeNi, or FeCo, for example, and may have a top surface that is coplanar with the top surface of non-magnetic layer 21 and that adjoins a bottom surface of an overlying trailing shield also known as PP3 trailing shield 26. The second trailing shield and PP3 trailing shield are typically made of 10-19 kG layers, and preferably, are a 16-19 kG material.

There is a top yoke 39 adjoining a back side of the non-magnetic layer 21 and contacting a top surface of the main pole 18, The top yoke and bottom yoke 36 transmit magnetic flux to the main pole where the flux 70 is concentrated at the write pole tip 14. The top yoke extends to a back side at point A where the top yoke touches the inner corner of PP3 26 above a main pole back portion. A bottom yoke may be included in the write head structure to provide faster writer response compared with designs where only a top yoke is employed. An insulation layer 22 is formed on a portion of the non-magnetic layer 21 and top yoke. When a current is passed through the driving coil layer 24 that is disposed on the insulation layer 22, magnetic flux is generated in the top yoke and in the main pole. The driving coil layer 24 may have one or a plurality of turns. Three turns are depicted above the main pole in this embodiment. Bucking coils are connected to driving coils through connector 31 that is a greater distance from the ABS than BGC 15a-15c.

First trailing shield 20a is separated from write pole tip 14 at the ABS by a write gap 17b that is made of an insulation material. PP3 trailing shield 26 is formed on trailing shield 20 along the ABS and on a portion of insulation layer 22 that is above non-magnetic layer 21. In the exemplary embodiment, the PP3 trailing shield arches over the first three driving coils in layer 24 and connects with the top surface of the top yoke above the BGC top surface 15s. The PP3 trailing shield may have a dome shape as depicted in FIG. 1 or may have a planar top surface that is parallel to a top surface of the main pole. An insulation layer 25 is formed on the insulation layer 22 and fills the openings between the turns of driving coil layer 24 and the space between a top surface of the driving coils and a bottom surface of the PP3 shield layer 26. A protection layer 27 covers the PP3 trailing shield and is made of an insulating material such as alumina. Above the protection layer and recessed a certain distance from the ABS 30-30 is an optional cover layer 29 that is preferably comprised of a low CTE material such as SiC that serves to reduce the WG protrusion rate. The SiC cover layer is recessed to avoid introducing a material at the ABS with different mechanical and etch resistance properties than adjacent layers which could adversely affect back end lapping and ion beam etching processes. An overcoat layer 28 is formed as the uppermost layer in the write head.

Referring to FIG. 2, an ABS view of the PMR writer in FIG. 1 is depicted according to a structure previously fabricated by the inventors. Leading shield 34, side shields 19 and trailing shield 20 form an all wrap around (AWA) design. Leading shield and side shields are preferably made of a 10-16 kG material, and the first trailing shield is preferably a composite with a lower 19-24 kG hot seed layer (first trailing shield) 20a contacting a top surface of the write gap 17b, and a 10-19 kG layer (second trailing shield 20b) adjoining a top surface of the hot seed layer and contacting a top surface of side shields 19. The leading shield adjoins a bottom surface of lead gap 17a, and side shields adjoin a side of the side gap that is a side gap distance d from the write pole tip 14. Write gap 17b has a thickness a, and a cross-track width w greater than track width TW that is essentially the width of trailing edge 14t. The write gap contacts a top surface (edge 14t) of the write pole tip in addition to top surfaces of side gaps 17s and portions of side shields 19 that are proximate to the side gaps.

The PMR writer in FIG. 2 requires optimization for use in advanced technologies. In particular, a thinner write gap thickness a, and narrower side gap dimension d are the preferred directions for better on track field gradient (BPI) and cross-track field gradient (TPI), respectively. As gap dimensions shrink and write pole dimensions become smaller, it is important to devise a scheme whereby WATE is controlled. Furthermore, for advanced PMR writer designs, it is desirable to have writeability from side shield height reduction and more main pole volume closer to the ABS while maintaining a good cross-track field gradient (TPI capability). Note that height reduction refers to the distance the side shields 19 extend from the ABS in an x-axis direction.

During dynamic magnetic recording, the high frequency magnetic field generated from the main pole will excite the dynamic magnetization rotation inside all of the surrounding shields. The dynamic magnetization rotations will propagate away from the main pole, and due to complicated domains in the shields including the trailing shield, the resulting magnetization wave may trigger localized magnetic charges that will cause WATE. It is believed that shields made of a high damping magnetic material will significantly reduce the propagation distance of the dynamic magnetization rotation wave due to fast energy dissipation under high damping constant. Hence, localized magnetic charge generation will be minimized in the shield structure thereby reducing the WATE. Micromagnetic modeling results are presented in a later section to illustrate the advantages of implementing a shield structure according to an embodiment of the present disclosure.

As we disclosed in related patent application HT14-022, one or more shields in an AWA shield structure may be a composite with a high saturation magnetization (hot seed) layer made of a 19-24 kG material and an outer layer that is a high damping (HD) magnetic layer to deliver improved writeability while maintaining or enhancing ADC. In view of the additional process steps with added cost required to fabricate a composite shield, we have discovered that the design objectives of improved WATE while maintaining ADC for magnetic shields may be achieved with a single magnetic layer made of a HD magnetic material in one or more of the leading shield, side shields, and trailing shield. The shield structure of the present disclosure enables a lower cost approach to achieving a shield design that is compatible with advanced writers where gap distances are reduced to a 20-50 nm range, and where side shield height is decreased to 0.15 micron or less.

In some embodiments of the present disclosure, the HD magnetic material is $Fe_xNi_{100-x}M$ that is an Fe rich alloy with an x content of $\geq 50$ atomic % and where M is a 3d, 4d, or 5d transition metal with a content between 3 and 15 atomic %. However, in other embodiments, alloys including but not limited to FeCoM, FeCoNiM, and FeNM where M is one of Re, Os, Ir, Rh, Ti, Ta, V, Cr, W, Mn, Mo, Cu, Zr, Nb, Hf, Ru, Pd, Pt, Ag, and Au with an M content of 3-15 atomic % may also be employed as the HD magnetic material in one or more of the side shields, leading shield, and second trailing shield.

Preferably, the HD magnetic layer has a damping parameter a which is at least 0.04, and preferably ≥0.05, that is substantially greater than a typical α value of about 0.02 for commonly used alloys such as FeCo, FeNi, and FeCoNi in shield structures. As the M content in the aforementioned alloys increases, a also becomes larger but at the expense of decreasing Ms. Thus, M has an upper limit of about 15 atomic % to prevent the Ms value in the HD magnetic layer from dropping below about 10 kG in the side shields, leading shield, and in the second trailing shield. M has an y content of at least 3 atomic % to yield a substantial increase in a of at least 100% for a $(Fe_xNi_{100-x})_{100-y}Re_y$ HD layer compared with a $Fe_xNi_{100-x}$ layer, for example. Moreover, the HD magnetic material preferably has a coercivity (Hc) less than 50 Oe. In other embodiments, an He value ≥50 Oe may be acceptable.

Figure 3A:
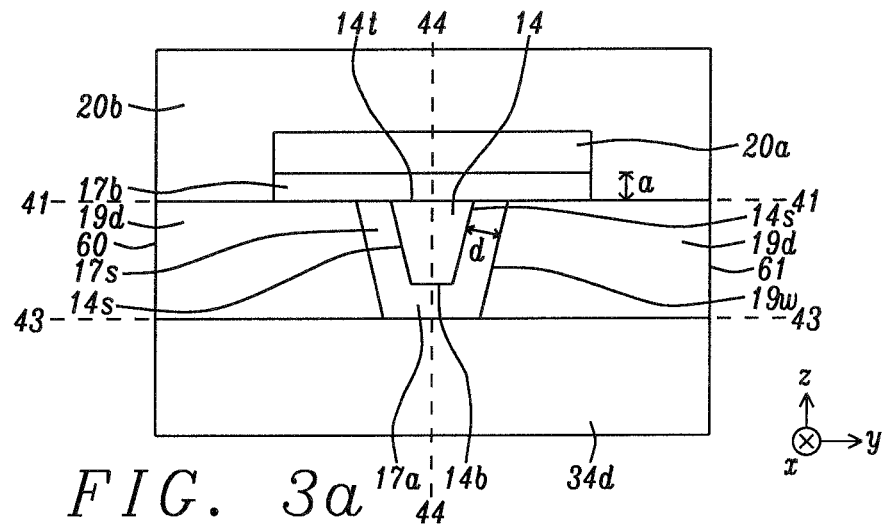
FIG. 3a is an ABS view showing the shield structure of a PMR writer wherein the leading shield and side shields have a high damping (HD) magnetic layer according to a first embodiment of the present disclosure.

According to a first embodiment of the present disclosure depicted in FIG. 3a, the AWA shield structure shown in FIG. 2 is retained except the conventional 10-19 kG magnetic material is replaced by a HD magnetic material having a Gilbert damping constant (a) of at least 0.04, and preferably ≥0.05 in side shields 19d and leading shield 34d. A bottom surface of second trailing shield 20b contacts the top surfaces of the side shields at plane 41-41 that is orthogonal to center plane 44-44 also includes the write pole edge 14t. Write pole sides 14s connect the write pole leading edge 14b to trailing edge 14t, and are formed equidistant from the center plane that is orthogonal to the ABS. The leading shield contacts the bottom surface of the lead gap 17b and adjoins the side shields along plane 43-43 which is aligned parallel to plane 41-41.

Figure 3B:
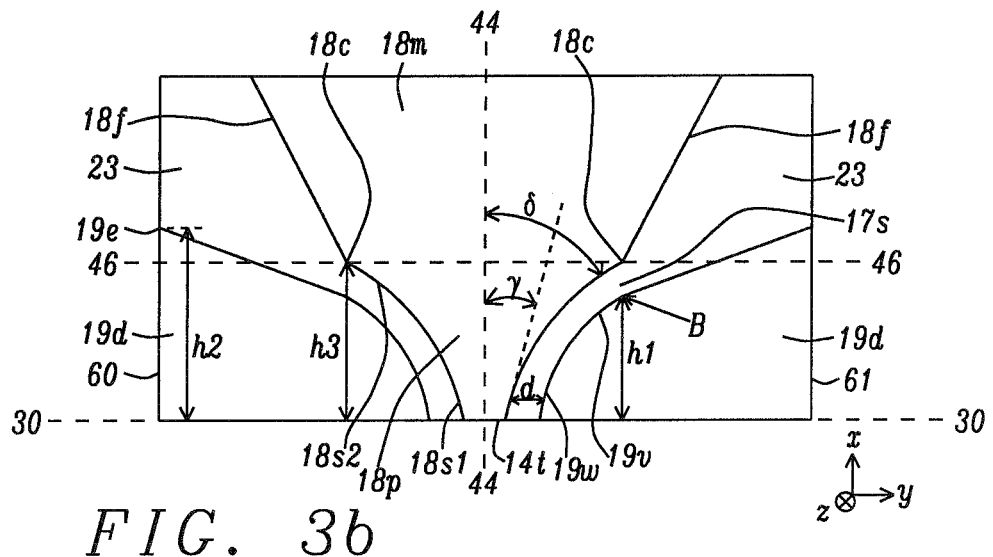
FIGS. 3b-3c show top-down views of the side shield structure in FIG. 3a according to embodiments of the present disclosure.

Referring to FIG. 3b, a top-down view according to one embodiment of the side shield structure from FIG. 3a is shown with the write gap and overlying trailing shield layers removed. Center plane 44-44 bisects the main pole including a back portion 18m thereof and is aligned orthogonal to the ABS 30-30. A front portion of the main pole also known as the write pole 18p has a leading side with an edge 14t at the ABS, and has a curved sidewall on each side of the center plane wherein a first portion 18s1 of curved sidewall is proximate to the ABS, and a second portion 18s2 is proximate to corner 18c where the curved sidewall connects with flared side 18f of the main pole back portion. First portion 18s1 forms an attack angle γ from 0 to 40 degrees, and preferably 18-20 degrees, with respect to center plane 44-44. In general, as the angle γ increases, the cross-track magnetic field gradient degrades. However, as angle γ approaches 0 degrees, then writeability is degraded. Therefore, we have found that γ=18 to 20 degrees is an optimum range to maintain an acceptable cross-track field gradient and writeability. Preferably, a first portion of side shield sidewall 19w that is a side gap distance d from first portion 18s1 is also formed at the γ angle with respect to the center plane. Second portion 18s2 is formed at an angle δ substantially greater than γ.

Side shields 19d each have a second sidewall portion 19v that faces the write pole, connects to an end of sidewall portion 19w, and is formed substantially parallel to curved sidewall portion 18s2 up to height h1 of at least 80-100 nm at point B where the sidewall 19v no longer follows the shape of the write pole and continues to an end 19e at sides 60 (or 61) of the side shield. The closest approach of main pole back portion 18m to the ABS is at plane 46-46 that includes corners 18c and is a third height h3 of >150 nm from the ABS. Curved sidewall portion 18s2 and second sidewall portion 19v that are proximate to corners 18c form a maximum angle δ substantially greater than γ with respect to center plane 44-44. Second height (h2) is the distance of end 19e from the ABS where h2>h1.

Figure 3C:
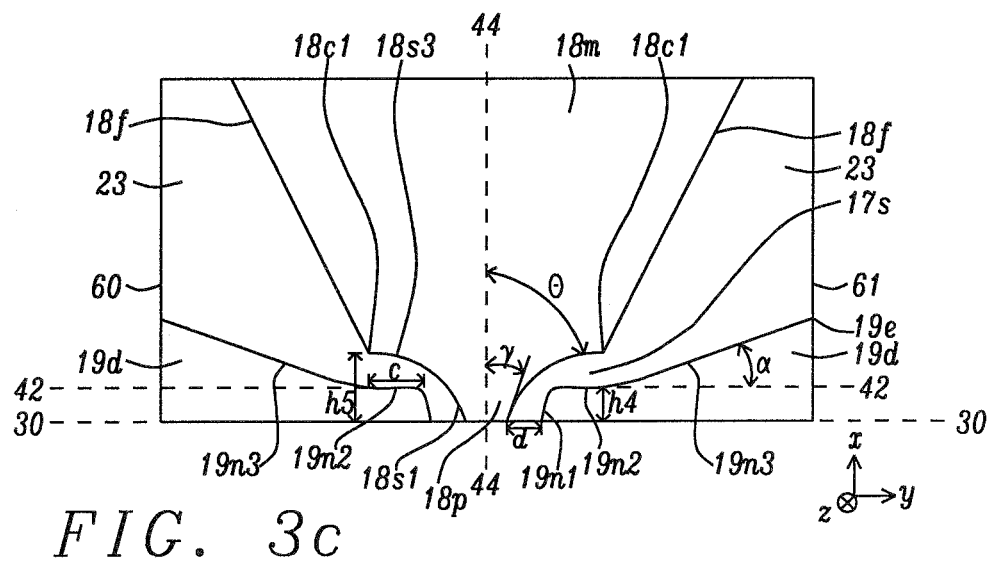

In FIG. 3c, an alternative embodiment is shown from a top-down perspective of the shield structure in FIG. 3a after trailing shields and the write gap are removed. Main pole flared sides 18f and the first portion 18s1 of curved write pole sidewall are retained from the first embodiment in FIG. 3b. It should understood that the ABS view of the FIG. 3b and FIG. 3c embodiments are both represented by the illustration in FIG. 1. One key feature of the alternative embodiment depicted in FIG. 3c is a modified shape for side shield 19d on each side of the center plane 44-44. Each side shield has a first sidewall section 19w proximate to the ABS 30-30 and substantially conforming to the shape of first curved sidewall portion 18s1 aligned at angle γ with respect to the center plane. Angle γ is also referred to as the attack angle and is between 0 and 40 degrees, and preferably from 18 to 20 degrees. Thus, first sidewall section 19w has a front end at the ABS, and is separated from first portion 18s1 of curved write pole sidewall by side gap distance d up to a height h4 that is 30-80 nm from the ABS, and significantly less than h1 in the FIG. 3b embodiment. The back end of the first sidewall section is at height h4 along plane 42-42 that is aligned parallel to the ABS. The side gap distance d is a cross-track width in the range of 20 to 60 nm.

Each side shield has a second sidewall section 19n2 formed substantially parallel to the ABS at height h4, and having a cross-track width c of 20 to 300 nm, and preferably 20-100 nm, between the back end of the first sidewall section and a third sidewall section 19n3. If c>300 nm and h4<80 nm, then the side shield could become saturated with loss in TPI. The third sidewall section extends to a far end 19e at a side 60 (or 61) of the side shield where the far end is a greater distance than h4 from the ABS. Each third sidewall section preferably forms an angle α of 20 to 60 degrees with respect to plane 42-42 which includes second sidewall 19n2. Throat height in the write pole 18p is defined as the distance along center plane 44-44 between the ABS and plane 42-42.

Another key feature is a portion 18s3 of the write pole sidewall proximate to corners 18c1 where the write pole 18p intersects the main pole back portion 18m. Sidewall 18s3 is formed substantially parallel to second sidewall section 19n2, and is at an angle θ of preferably 90±5 degrees with respect to center plane 44-44. Greater curvature in the continuous write pole sidewall between the ABS and corner 18c1, expressed here as (θ−γ), allows corners 18c1 to be at a height h5 of 80 to 150 nm from the ABS, a substantial reduction from height h3 of corners 18c in FIG. 3b. As a result, there is a greater volume of main pole that is within 150 nm of the ABS in the FIG. 3c design that leads to less internal flux leakage from main pole to side shields, and better overwrite.

Figure 4:
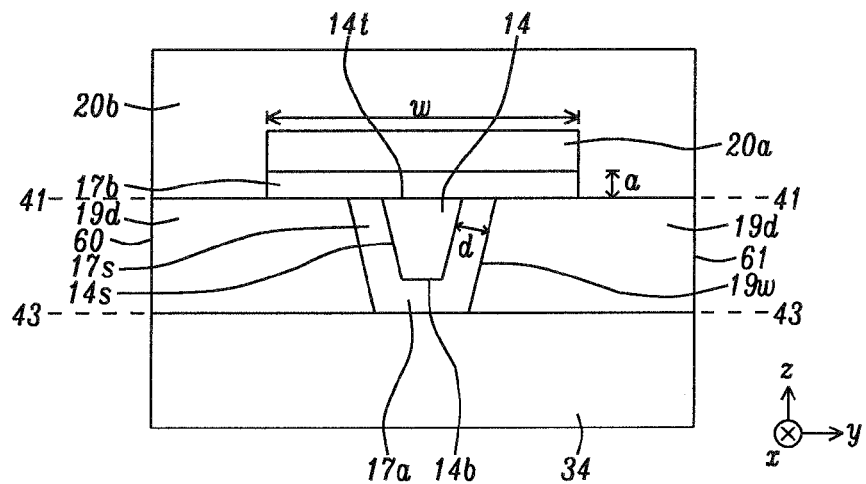
FIG. 4 is an ABS view showing the shield structure of a PMR writer wherein the side shields consist of a HD magnetic layer according to a second embodiment of the present disclosure.

Referring to FIG. 4, another embodiment of the present disclosure is depicted wherein the side shields 19d that are made of a HD magnetic material are retained from the FIG. 3a embodiment, but leading shield 34 and second trailing shield 20b may be a conventional magnetic material such as FeCo, FeNi, and FeCoNi. It is also noted that hot seed layer 20a, the first trailing shield, is preferably maintained in all embodiments of the present disclosure. Those skilled in the art will appreciate the benefit of WATE reduction enabled by the shield structure in FIG. 3a may not be as evident when replacing the HD magnetic material in leading shield 34d with a conventional leading shield 34 in FIG. 4. However, the contribution to WATE by conventional side shields is believed to be substantial which means the embodiment wherein HD magnetic material is present only in side shields 19d (FIG. 4) will provide desirable WATE reduction as well.

Figure 5:
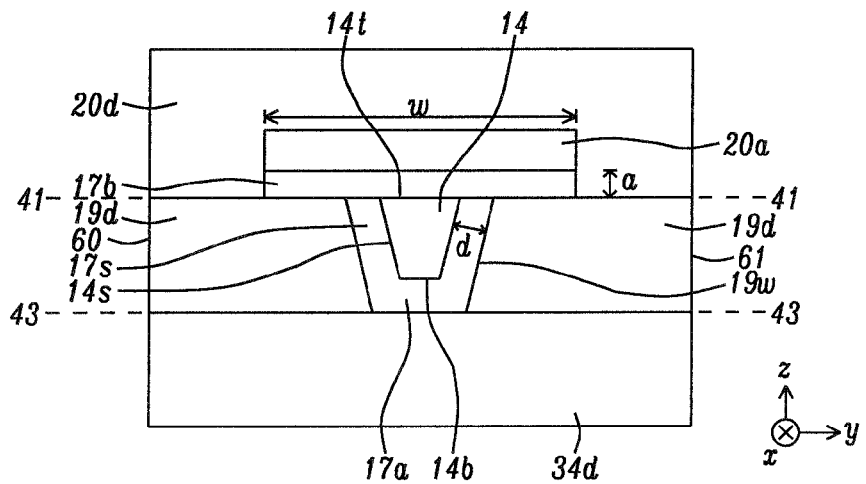
FIG. 5 is an ABS view showing the shield structure of a PMR writer wherein the second trailing shield, side shields, and leading shield consist of a HD magnetic material according to a third embodiment of the present disclosure.

Referring to FIG. 5, a third embodiment of the present disclosure is illustrated wherein leading shield 34, side shields 19, and second trailing shield 20b in FIG. 2 are replaced by HD magnetic shields 34d, 19d, and 20d, respectively. It should be understood that second trailing shield 20b contributes to WATE so it is believed that replacing conventional magnetic material in the second trailing shield 20b with HD magnetic layer 20d may provide an additional reduction in WATE compared with the embodiment in FIG. 3a. Thus, shields 34d, 19d, and 20d form an all wrap around shield configuration where the leading shield adjoins a bottom surface of the side shields at plane 43-43, and second trailing shield 20d contacts a top surface of the side shields at plane 41-41.

Figure 6:
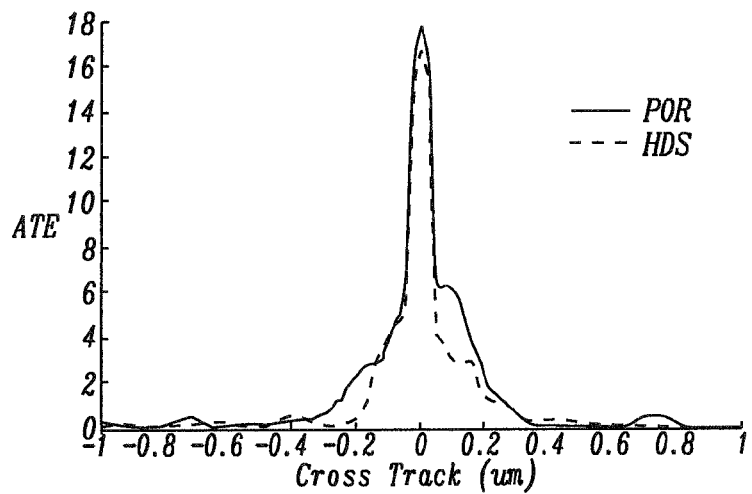
FIG. 6 is a micromodeling plot of adjacent track erasure vs. cross-track position for the POR shield design in FIG. 2 and for the first embodiment of the present disclosure.

FIG. 6 is a graph showing the results of a micromagnetic modeling study where ATE is shown as a function of cross-track position for the PMR writer with the POR shield structure in FIG. 2 (solid line), and for the AWA shield design with HD magnetic material in the side shields and leading shield (dashed line) according to the FIG. 3a embodiment of the present disclosure. When $\alpha=0.02$ is used for the POR shield structure, and $\alpha=0.05$ for the leading shield and side shields in the FIG. 3a embodiment, the results indicate substantially lower ATE at cross-track positions greater than about 0.1 micron from the center track position. These results are believed to occur because the magnetization rotation wave associated with the Hy field is at least partially prevented from entering the shield structure due to the presence of the HD magnetic layers. Moreover, we have found ADC to be maintained even as WATE is reduced for PMR writers having a shield structure according to an embodiment of the present disclosure.

Figure 7:
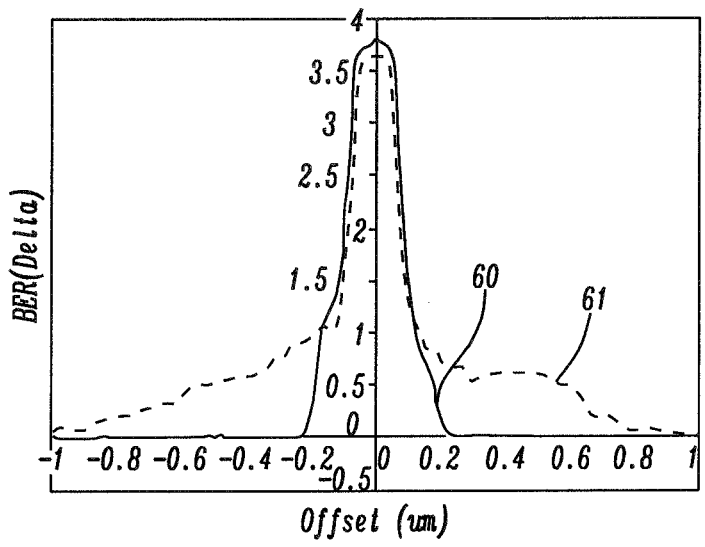
FIG. 7 is a plot of delta bit error rate (BER) vs. cross-track position from spinstand measurements showing results for a PMR writer with a shield structure depicted in FIG. 2 and according to the first embodiment of the present disclosure.

FIG. 7 depicts results from a well-known spinstand measurement where delta bit error rate (BER) is plotted as a function of cross-track offset from a center track position. The results are consistent with the modeling study and FIG. 6 data, and confirm that WATE is significantly reduced for the PMR writer with side shield structure shown in FIG. 3a (line 60) compared with the POR shield design in FIG. 2 (line 61). For this experiment, the leading shield 34d and side shields 19d were constructed from FeNiRe with $\alpha=0.5$ and the second trailing shield 20b from a conventional $\alpha=0.02$ alloy. The POR shield structure employed in this experiment has all shields 19, 20b, and 34 made from an alloy with $\alpha=0.02$. In both cases, the first trailing shield 20a is a 19-24 kG magnetic layer with $\alpha=0.02$.

The present disclosure also encompasses a method of forming a PMR writer having an AWA shield design as depicted in FIG. 3a or FIG. 5. Only the process steps from leading shield formation to trailing shield deposition are described. The remainder of the fabrication sequence comprises conventional steps that are well known in the art and are not described herein.

Figure 8A:
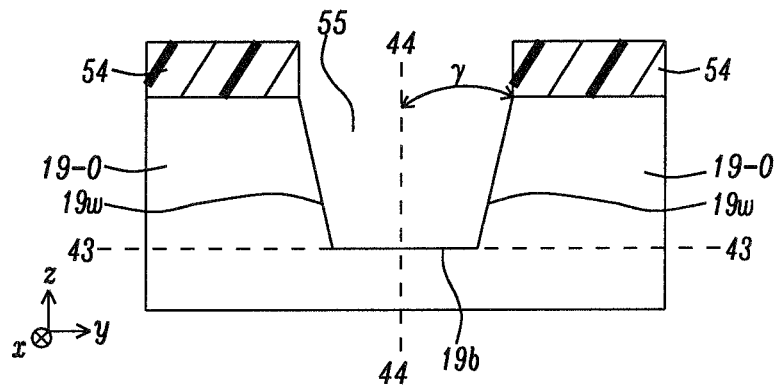

From a cross-sectional perspective at the eventual ABS in FIG. 8a, a HD magnetic layer 19-0 is deposited on a substrate (not shown) that may be LSC 33 (FIG. 1). The 10-16 kG HD magnetic layer 19-0 may be electroplated by a conventional method. A photoresist layer 54 is coated on a top surface of the HD magnetic layer, and is patternwise exposed and developed by a conventional process to form an opening 55 therein that corresponds to the desired shape of the main pole to be deposited in a subsequent step. Thereafter, opening 55 is transferred by an etching process such as ion beam etch (IBE) through an upper portion of HD magnetic layer and stops at a plane 43-43 to expose a bottom 19b of the opening thereby exposing a section of top surface of a bottom portion of HD magnetic layer below plane 43-43. The two upper portions of layer 19-0 with sidewall 19w will hereafter be referred to as side shields 19d, and the unetched bottom portion below plane 43-43 will become leading shield 34d.

Figure 8B:
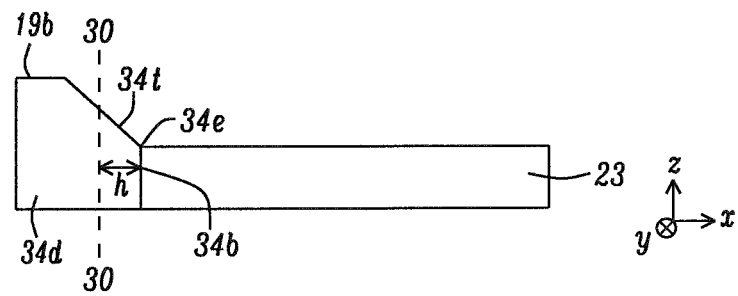
FIGS. 8b, 13b are down-track cross-sectional views depicting the PMR writer structure in FIG. 8a, 13a, respectively.

FIG. 8b is a down-track cross-sectional view along plane 44-44 in FIG. 8a after the photoresist layer 54 is removed by a well-known method, and shows the eventual ABS (plane 30-30) that is determined after a lapping process at the end of the PMR writer fabrication sequence. A photoresist patterning and etching sequence as described in related U.S. Pat. No. 8,749,919 may be used to form a tapered trailing side 34t on leading shield 34d that intersects the eventual ABS and terminates at a back end 34e at back side 34b which is a height h from plane 30-30. The tapered leading side 34t at plane 30-30 is a greater down-track distance than the back end from the bottom surface 19b. According to one embodiment, back side 34b adjoins a front side of dielectric layer 23.

Figure 9:
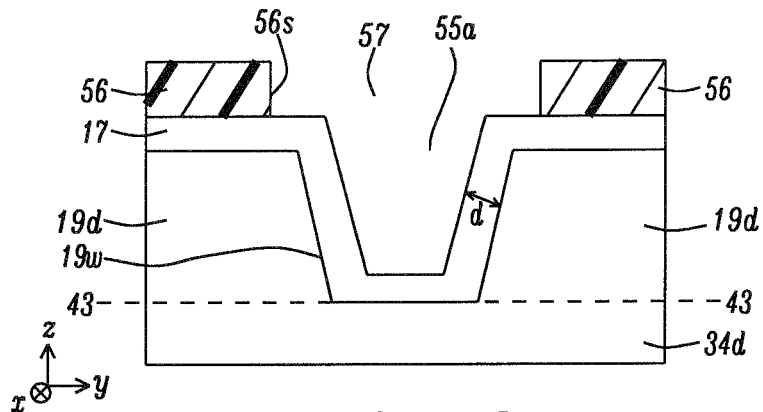

Referring to FIG. 9, gap layer 17 is preferably conformally deposited with a thickness d of about 20 to 50 nm on bottom 19b, sidewalls 19w, and on a top surface of side shields 19d to give an opening 55a that has a smaller cross-track width than original opening 55. The gap layer becomes the leading gap proximate to plane 43-43, and side gap layers along sidewalls 19w in the final shield structure. It should be understood that the gap layer may be a composite such as a lower alumina layer contacting the HD magnetic layer 19d and 34d, and an upper Ru layer disposed on the alumina layer. Thereafter, photoresist layer 56 is coated on the gap layer and is patterned by a conventional process to form opening 57 that exposes opening 55a and a top surface of the gap layer between sidewalls 56s and opening 55a.

Figure 10:
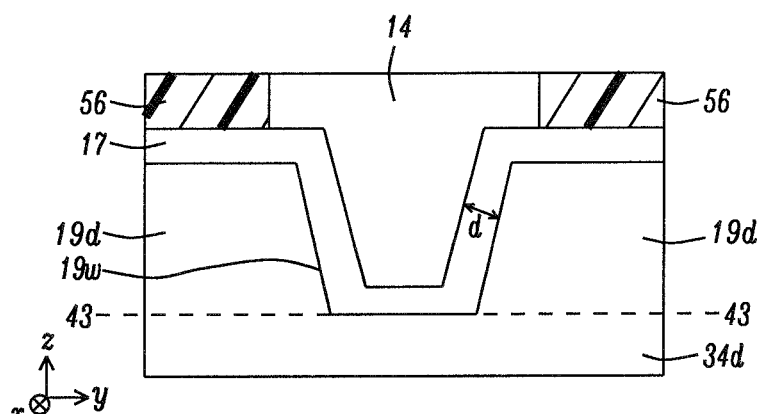
Figure 11:
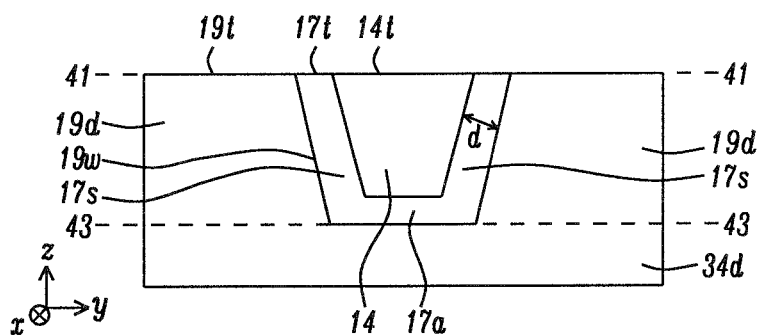

Referring to FIG. 10, the main pole including write pole tip 14 at the ABS is electroplated to fill openings 55a, 57. In FIG. 11, the partially formed shield structure is depicted after a chemical mechanical polish (CMP) process is employed to remove photoresist layer 56 and also the top portions of the main pole and gap layer such that a top surface 19t of side shield layers 19d becomes coplanar with a top surface 17t of side gap 17s, and with write pole trailing edge 14t at plane 41-41. Side portions of the gap layer become side gaps 17s, and a bottom portion is now shown as leading gap 17a.

In some embodiments, ion milling may be used to form a taper on the main pole trailing side which has a front end at edge 14t by using a process sequence previously described in related U.S. Pat. No. 8,749,919.

Figure 12:
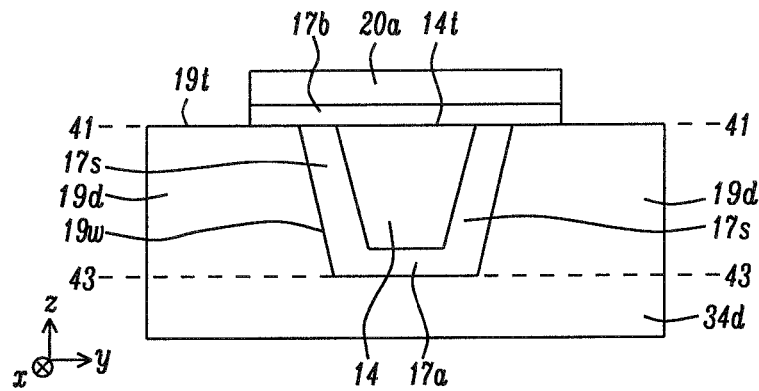

Referring to FIG. 12, a conventional process sequence known to those skilled in the art is used to form a write gap 17b and overlying first trailing shield layer (hot seed) 20a each with a cross-track width w above write pole trailing edge 14t, side gaps 17s, and above a portion of top surface 19t adjacent to the write gap.

Figure 13A:
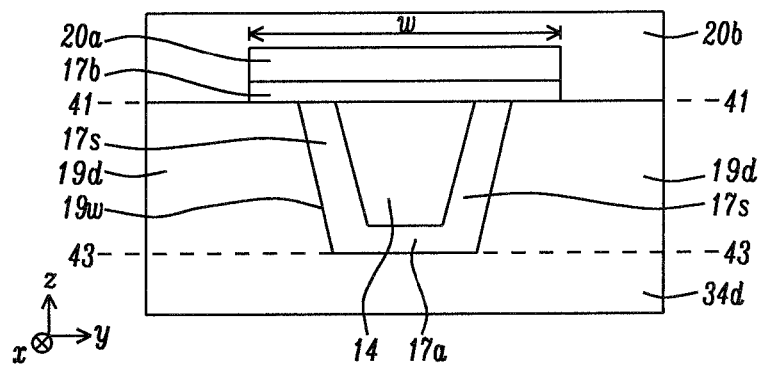
Figure 13B:
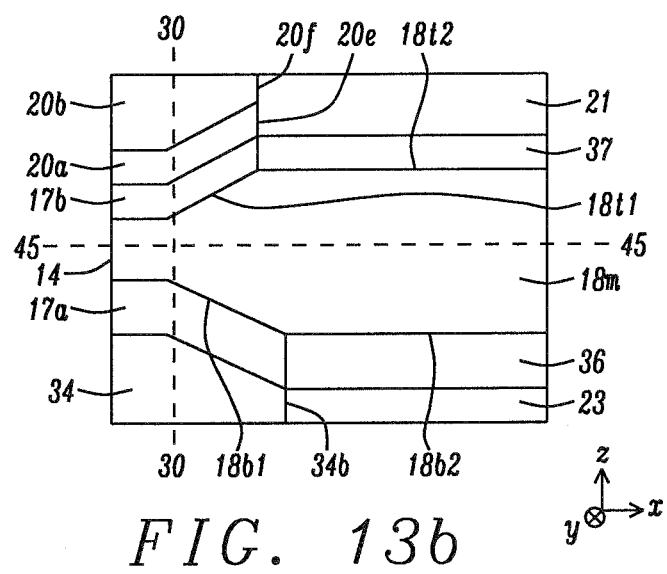

Referring to FIG. 13a, a cross-sectional view is shown along the eventual ABS plane 30-30 in FIG. 13b. Second trailing shield 20b is electroplated on hot seed layer 20a and on exposed portions of top surface 19t to form the AWA shield structure shown in FIG. 3a. In an alternative embodiment, HD magnetic layer 20d is deposited as the second trailing shield on hot seed layer 20a to form the shield configuration in FIG. 5. In some embodiments, HD magnetic layer 20d may have a different composition from the HD magnetic material used in side shields 19d and leading shield 34d. For example, the HD magnetic material employed in layer 20d may have a higher kG value than the HD magnetic material in layers 19d, 34d.

Those skilled in the art will recognize that the shield structure in FIG. 4 may be fabricated with slight modifications in the process which forms the partially constructed shield structure in FIG. 8a. In particular, leading shield 34 may be first deposited to form the bottom portion of shield below plane 43-43. Next, HD magnetic layer 19-0 is deposited on the leading shield and an opening 55 is etched therein to form a bottom 19b at plane 43-43 and side shields 19d with sidewalls 19w on either side of the opening. Subsequent processes follow the flow previously described with respect to FIGS. 9-13a.

FIG. 13b depicts a down-track cross-sectional view of the shield structure in FIG. 13a. In the exemplary embodiment, the write pole portion of the main pole has a tapered leading side 18b1 and a tapered trailing side 18t1 at the ABS 30-30. The ABS is formed in a subsequent step by a lapping process after all layers in the write head are fabricated. Tapered leading side terminates at leading edge 14b (FIG. 3a) and is connected at a back end to a leading side 18b2 of the main pole back portion 18m where leading side 18b2 is aligned orthogonal to the ABS and adjoins dielectric layer 36. A back end of the tapered trailing side is connected to a trailing side 18t2 of the main pole back portion wherein trailing side 18t2 is aligned orthogonal to the ABS and adjoins dielectric layer 37. Although back side 34b of the leading shield is depicted with a greater height from the ABS than back sides 20e, 20f, respectively, of trailing shield layers 20a, 20b, the present disclosure also anticipates that back side 34b may be formed closer to the ABS than back sides 20e, 20f. The embodiments described herein also encompass other shapes for the leading shield and trailing shield. For example, hot seed layer 20a is not necessarily uniformly thick in a down-track direction, and may have a smaller thickness at back side 20e than at the ABS.

There is a plane 45-45 aligned orthogonal to the ABS and center plane 44-44 where plane 45-45 bisects the main pole. Write pole sides 18b1, 18t1 are said to be tapered since a back end of each side is a greater distance from plane 45-45 than a front end of each side at the ABS 30-30.

The present disclosure relates to an AWA shield structure that is less complicated and less expensive to fabricate than side shield and leading shield configurations having a composite design. Moreover, there is flexibility in the shield structure of the embodiments disclosed herein in that conventional magnetic layers in one or more of the leading shield, side shields, and second trailing shield may be replaced with a HD magnetic layer with a damping constant α of at least 0.04, and wherein Hc and Ms may be adjusted by selection of one of the alloys FeNiM, FeNM, FeCoM, or FeCoNiM and the M element therein.

While the present disclosure has been particularly shown and described with reference to, the preferred embodiment thereof, it will be understood by those skilled in the art that various changes in form and details may be made without departing from the spirit and scope of this disclosure.

We claim:

1. A perpendicular magnetic recording (PMR) writer, comprising:
    (a) a main pole comprised of a write pole portion having a leading side adjoining a lead gap, and with a leading edge at an air bearing surface (ABS), and having a trailing side adjoining a write gap, and a trailing edge at the ABS;
    (b) a gap layer surrounding the main pole, the gap layer includes the lead gap, the write gap, and a side gap which contacts each of two sidewalls of the write pole portion wherein each sidewall is equidistant from a center plane that is aligned orthogonal to the ABS; and
    (c) an all wrap around (AWA) shield structure wherein one or more of a leading shield, side shields, and a second trailing shield consist of a high damping (HD) magnetic layer having a damping constant α of at least 0.04, comprising:
        (1) the leading shield having a side that contacts the lead gap and contacts a bottom surface of the side shields along a first plane that is orthogonal to the center plane;
        (2) a composite trailing shield wherein a first trailing shield made of a 19-24 kG hot seed layer adjoins a top surface of the write gap, and the second trailing shield adjoins a top surface of the hot seed layer, and contacts a top surface of the side shields at a second plane that is parallel to the first plane; and
        (3) the side shields wherein a side shield on each side of the center plane has a side adjoining the side gap.

2. The PMR writer of claim 1 wherein the high damping magnetic layer is an alloy that is one of FeNiM, FeCoM, FeNM, and FeCoNiM where M is one of Re, Os, Ir, Rh, Ti, Ta, V, Cr, W, Mn, Mo, Cu, Zr, Nb, Hf, Ru, Pd, Pt, Ag, and Au.

3. The PMR writer of claim 2 wherein the high damping magnetic layer is FeNiRe wherein the Re content is from about 3 to 15 atomic %.

4. The PMR writer of claim 1 wherein the side shields consist of the HD magnetic layer, and the leading shield and the second trailing shield are made of FeCo, FeCoNi, or FeNi.

5. The PMR writer of claim 1 wherein the leading shield and the side shields consist of the HD magnetic layer, and the second trailing shield is made of FeCo, FeCoNi, or FeNi.

6. The PMR writer of claim 1 wherein each of the leading shield, side shields, and the second trailing shield consist of the HD magnetic layer.

7. The PMR writer of claim 1 wherein the high damping magnetic layer is a 10-19 kG material.

8. The PMR writer of claim 1 wherein a coercivity (Hc) of the high damping magnetic layer is less than 50 Oe.

9. The PMR writer of claim 1 wherein each of the sidewalls of the write pole portion proximate to the ABS is formed at an angle γ of about 0 to 40 degrees with respect to the center plane, and each of the sidewalls of the write pole portion is formed at an angle δ with respect to the center plane at a location proximate to a corner where the write pole portion intersects a back portion of the main pole, and δ>γ.

10. The PMR writer of claim 9 wherein each side shield has a sidewall that follows a curvature of an adjacent write pole sidewall up to a point proximate to one of the corners.

11. The PMR writer of claim 1 wherein each of the sidewalls of the write pole portion proximate to the ABS is formed at an angle γ of about 0 to 40 degrees with respect to the center plane, and each of the sidewalls of the write pole portion is formed at an angle θ of about 90±5 degrees with respect to the center plane at a location proximate to a corner where the write pole portion intersects a back portion of the main pole.

12. The PMR writer of claim 11 wherein each side shield has a first sidewall section that is substantially parallel to the write pole portion sidewall that is proximate to the ABS.

13. The PMR writer of claim 12 wherein each side shield further comprises a second sidewall section that is substantially parallel to the ABS and is connected to an end of the first sidewall section.

14. The PMR writer of claim 1 wherein one or both of the leading side and the trailing side are tapered in that a back end of the one or both leading side and trailing side is a greater distance than a front end at the ABS from a plane that bisects the main pole and is orthogonal to the center plane and to the ABS.

15. A method of forming an all wrap around (AWA) shield structure in a perpendicular magnetic recording (PMR) writer, comprising:
  (a) providing a high damping (HD) magnetic layer having a damping constant α of at least 0.04, the HD magnetic layer is formed on a substrate;
  (b) forming an opening with a sidewall in each of two upper side shield portions of the HD magnetic layer wherein a bottom of the opening exposes a section of top surface on a leading shield portion of the HD magnetic layer, the sidewalls are equidistant from a center plane that intersects the bottom of the opening;
  (c) conformally depositing a gap layer on the top surface of the leading shield portion and on the sidewalls within the opening to form a lead gap and side gaps, respectively;
  (d) electroplating a main pole layer on the lead gap and side gaps such that the main pole layer fills the opening;
  (e) performing a chemical mechanical polish (CMP) process to form top surfaces of the side gaps, main pole layer, and the upper side shield portions at a second plane that is orthogonal to the center plane;
  (f) sequentially forming a write gap and then a first trailing shield that is made of a 19-24 kG hot seed layer on the main pole layer, side gaps, and adjacent sections of the upper side shield portions at the second plane, the write gap and first trailing shield each have a first cross-track width; and
  (g) forming a second trailing shield on the first trailing shield, and on exposed portions of the upper side shield portions at the second plane.

16. The method of claim 15 wherein the HD magnetic layer is an alloy that is one of FeNiM, FeCoM, FeNM, and FeCoNiM where M is one of Re, Os, Ir, Rh, Ti, Ta, V, Cr, W, Mn, Mo, Cu, Zr, Nb, Hf, Ru, Pd, Pt, Ag, and Au.

17. The method of claim 16 in which the HD magnetic layer is FeNiRe wherein the Re content is from about 3 to 15 atomic %.

18. The method of claim 15 wherein the second trailing shield is made of FeCo, FeCoNi, or FeNi.

19. The method of claim 15 wherein the second trailing shield is a HD magnetic layer that is one of FeNiM, FeCoM, FeNM, and FeCoNiM where M is one of Re, Os, Ir, Rh, Ti, Ta, V, Cr, W, Mn, Mo, Cu, Zr, Nb, Hf, Ru, Pd, Pt, Ag, and Au.

20. The method of claim 15 further comprised of forming a taper on the main pole top surface before forming the write gap.

21. The method of claim 15 wherein the HD magnetic layer is a 10-19 kG material.

22. The method of claim 15 wherein a coercivity (Hc) of the HD magnetic layer is less than about 50 Oe.

23. The method of claim 15 further comprised of a lapping process to form an air bearing surface (ABS) that is orthogonal to the center plane and to the second plane, and exposes each of the main pole layer, side gaps, upper side shield portions, leading gap, leading shield portion, write gap, and first and second trailing shields at the ABS.

24. The method of claim 23 wherein the sidewalls of the upper shield portions proximate to the ABS are formed at an angle γ of 0 to about 40 degrees with respect to the center plane.

* * * * *